(12) United States Patent
Yang et al.

(10) Patent No.: US 12,084,737 B2
(45) Date of Patent: Sep. 10, 2024

(54) GRADIENT-STRUCTURED ULTRA-FINE BAINITIC LOW-ALLOY RAIL STEEL AND PREPARATION METHOD THEREOF

(71) Applicant: Yanshan University, Qinhuangdao (CN)

(72) Inventors: Zhinan Yang, Qinhuangdao (CN);
Fucheng Zhang, Qinhuangdao (CN);
Jianjun Wang, Qinhuangdao (CN);
Hongguang Li, Qinhuangdao (CN);
Zhuanqin Liang, Qinhuangdao (CN);
Qingchao Wang, Qinhuangdao (CN);
Changbo Liu, Qinhuangdao (CN);
Dongyun Sun, Qinhuangdao (CN);
Xinliang Gao, Qinhuangdao (CN);
Chen Chen, Qinhuangdao (CN)

(73) Assignee: YANSHAN UNIVERSITY, Qinhuangdao (CN)

( * ) Notice: Subject to any disclaimer, the term of this patent is extended or adjusted under 35 U.S.C. 154(b) by 0 days.

(21) Appl. No.: 18/471,144

(22) Filed: Sep. 20, 2023

(65) Prior Publication Data
US 2024/0218478 A1    Jul. 4, 2024

(30) Foreign Application Priority Data
Dec. 28, 2022    (CN) .......................... 202211692832.5

(51) Int. Cl.
| | | |
|---|---|---|
| *C21D 9/04* | (2006.01) | |
| *C21D 1/84* | (2006.01) | |
| *C21D 6/00* | (2006.01) | |
| *C22C 38/00* | (2006.01) | |
| *C22C 38/02* | (2006.01) | |
| *C22C 38/04* | (2006.01) | |
| *C22C 38/06* | (2006.01) | |
| *C22C 38/44* | (2006.01) | |
| *C22C 38/46* | (2006.01) | |
| *C22C 38/48* | (2006.01) | |
| *C22C 38/50* | (2006.01) | |
| *C22C 38/54* | (2006.01) | |

(52) U.S. Cl.
CPC ................ *C21D 9/04* (2013.01); *C21D 1/84* (2013.01); *C21D 6/004* (2013.01); *C21D 6/005* (2013.01); *C21D 6/008* (2013.01); *C22C 38/001* (2013.01); *C22C 38/002* (2013.01); *C22C 38/02* (2013.01); *C22C 38/04* (2013.01); *C22C 38/06* (2013.01); *C22C 38/44* (2013.01); *C22C 38/46* (2013.01); *C22C 38/48* (2013.01); *C22C 38/50* (2013.01); *C22C 38/54* (2013.01); *C21D 2211/002* (2013.01); *C21D 2211/005* (2013.01); *C21D 2211/009* (2013.01)

(58) Field of Classification Search
None
See application file for complete search history.

(56) References Cited

U.S. PATENT DOCUMENTS

| | | | |
|---|---|---|---|
| 2019/0144979 A1 | 5/2019 | Zhang et al. | |
| 2019/0194772 A1 | 6/2019 | Wang et al. | |

FOREIGN PATENT DOCUMENTS

| | | |
|---|---|---|
| CN | 106191665 | 12/2016 |
| CN | 111394661 | 7/2020 |
| CN | 113073262 | 7/2021 |
| CN | 114015945 | 2/2022 |

OTHER PUBLICATIONS

Li Wei et al., "Effect of heat treatment process on surface microstructure and properties of nano-bainite carburized bearing steel", Journal of Mechanical Engineering, Feb. 28, 2021, vol. 57, No. 4., pp. 63-72.
Notification to Grant Patent Right for Invention from SIPO in application No. 202211692832.5 dated Jun. 27, 2023.
Notice of the First Office Action from SIPO in application No. 202211692832.5 dated May 25, 2023.
Retrieval report from SIPO in application No. 202211692832.5 dated May 23, 2023.
Supplementary Retrieval report from SIPO in application No. 202211692832.5 dated Jun. 20, 2023.

*Primary Examiner* — Jenny R Wu
(74) *Attorney, Agent, or Firm* — Piloff Passino & Cosenza LLP; Rachel K. Piloff; Sean A. Passino

(57) ABSTRACT

A gradient-structured ultra-fine bainitic low-alloy rail steel and a preparation method thereof are provided in the present application, belonging to the technical field of steel metallurgy. The rail steel to be treated is subjected to three thermal processing treatments so that the gradient-structured ultra-fine bainitic rail steel has a gradient structure consisting of a ferrite-pearlite dual phase microstructure and an ultra-fine bainite microstructure. The gradient structure of the present application enables the matrix of the rail to be a ferrite-pearlite composite phase structure, and only the surface layer of the service surface to be ultrafine bainite.

5 Claims, 3 Drawing Sheets

GRADIENT-STRUCTURED ULTRA-FINE BAINITIC LOW-ALLOY RAIL STEEL AND PREPARATION METHOD THEREOF

CROSS-REFERENCE TO RELATED APPLICATIONS

This application claims priority to Chinese Patent Application No. 202211692832.5, filed on Dec. 28, 2022, the contents of which are hereby incorporated by reference.

TECHNICAL FIELD

The present application relates to the technical field of steel metallurgy, and in particular to a gradient-structured ultra-fine bainitic low-alloy rail steel and a preparation method thereof.

BACKGROUND

Bainitic steel features in superior wear resistance and toughness over pearlitic steel, as well as higher strength than high manganese steel, together with appropriate toughness and hardness and excellent resistance to rolling fatigue and to abrasion, making it one of the excellent alternative materials for manufacturing railway tracks, including rails and rutting forks.

At present, the rail steels are produced to have a homogeneous overall microstructure, including pearlitic rail steel, which is air-cooled after rolling to obtain a microstructure that is entirely pearlitic, high manganese rutting fork steel, which is treated by water toughening to obtain an austenitic microstructure as a whole; and bainitic rail steel, which is either air-cooled after hot processing or continuous cooled with blown air, etc., so that the entire bainitic rail steel is organized homogeneously as a composite microstructure of granular bainite+lath bainite, or a composite microstructure of bainite+martensite. The bainitic rail steels are characterized by high strength, resulting in high hydrogen embrittlement susceptibility for all rail steels with high overall strength.

Generally the bainitic steel has higher hydrogen embrittlement sensitivity than pearlitic steel, which means that the bainitic rail steel is easy to be damaged by hydrogen embrittlement in the service process, especially the bottom area of the rail steel, which is more easily damaged by hydrogen embrittlement due to the influence of water and moisture on the ground. In addition, the current bainitic rail steel is high in alloying elements, including high content of Mn, Cr, Mo, etc., in order to ensure the performance of bainitic steel, especially hardenability. Such elements are prone to segregation, producing obvious segregation strips after continuous casting, rolling or forging, and leading to unstable performance in the rail service process. Thus, there is an irreconcilable contradiction between the high hardenability required for bainitic rail steels and the consequent segregation caused by the high alloying element content.

SUMMARY

To solve the above technical problems, the present application provides a gradient-structured ultra-fine bainitic low-alloy rail steel and a preparation method thereof.

To achieve the above objectives, the present application provides following technical schemes:
one of the technical schemes of the present application is as follows:
a gradient-structured ultra-fine bainitic low-alloy rail steel, the rail steel includes a matrix of a dual-phase microstructure of ferrite-pearlite and a surface layer of ultra-fine bainite microstructure, forming a gradient structure transitioning from ultra-fine bainite to ferrite-pearlite.

Another technical scheme of the present application is as follows:
a preparation method of the gradient-structured ultra-fine bainitic low-alloy rail steel, including following steps:
(1) carrying out a first thermal processing treatment on a rail steel to be treated, so that the rail steel to be treated obtains a dual-phase microstructure of ferrite-pearlite;
(2) carrying out a second thermal processing treatment on the rail steel to be treated with the dual-phase microstructure of ferrite-pearlite obtained in the step (1), so that an ultra-fine bainite microstructure is developed on a working surface side of the rail steel to be treated with the dual-phase microstructure of ferrite-pearlite, and the rail steel integrally forms a gradient structure transitioning from ultra-fine bainite to ferrite-pearlite; and
(3) carrying out a third thermal processing treatment on the rail steel to be treated with a gradient structure of ultra-fine bainite-ferrite-pearlite formed in the step (2), so as to stabilize the gradient structure of the rail steel to be treated, then obtaining the gradient-structured ultra-fine bainitic low-alloy rail steel.

Optionally, the step (1) specifically includes following steps:
austenitizing the rail steel to be treated to obtain an austenitized rail steel to be treated;
carrying out cooling on the austenitized rail steel to be treated to a first preset temperature at a first cooling speed, then carrying out first temperature holding or first slow cooling, so that the rail steel to be treated forms the dual-phase microstructure of ferrite-pearlite; the first cooling speed is in a range of 0.3 degrees Celsius per second (° C./s)-20° ° C./s, and the first preset temperature is in a range of 550° C.-750° ° C.

Optionally, the first slow cooling specifically includes:
cooling the rail steel to be treated to a second preset temperature at a first slow cooling speed, and cooling the rail steel to be treated to a third preset temperature at a second cooling speed;
the first slow cooling speed is in a range of 0.01° C./s-0.1° C./s, and the second preset temperature is in a range of 500° C.-650° C.; and
the second cooling speed is in a range of 0.1° C./s-10° C./s, and the third preset temperature is in a range of 200° ° C.-350° C.

Optionally, the step (2) specifically includes following steps:
carrying out rapid heating on a working side surface of the rail steel to be treated with the dual-phase microstructure of ferrite-pearlite obtained in the step (1) for austenitizing treatment, followed by temperature holding, and cooling the rail steel to be treated to a fourth preset temperature at a third cooling speed, then performing second temperature holding or second slow cooling to develop the ultra-fine bainite microstructure in a region of rapid heating layer of the rail steel to be treated; and
the third cooling speed is in a range of 0.6° C./s-20° C./s, the fourth preset temperature is in a range of Ms−20° C.-Ms+50° C., where Ms is an onset temperature of martensitic transformation of the rail steel; and a speed of the second slow cooling is in a range of 0.005° C./s −0.2° C./s.

Optionally, a heating speed of the rapid heating is in a range of 5° C./s-200° C./s; a duration for the temperature holding is in a range of 1 s −10 minutes (min); the working side surface of the rail steel to be treated covers a depth in a range of 0.5 millimeter (mm)-50 mm below a surface of the rail steel.

Optionally, the step (3) specifically includes following steps:

carrying out a tempering treatment on the rail steel to be treated with the gradient structure of ultra-fine bainite-ferrite-pearlite formed in the step (2), so as to stabilize the gradient structure of the rail steel to be treated, then obtaining the gradient-structured ultra-fine bainitic low-alloy rail steel; and a tempering temperature during the tempering treatment is in a range of 200° ° C.-500° C.

Optionally, the rail steel to be treated is a low-alloy steel, with components include, by mass percentage, C: 0.25-0.55, Mn: 0.5-2.0, Al+Si: 0.8-1.8, Cr+Mo+Ni<1.5, V+Nb+B: 0.06-0.20, P<0.02, S<0.02, Ti<0.01, O<0.0015, N<0.008, H<0.0001, with Fe as a balance.

Optionally, the rail steel to be treated is a low-alloy steel, with components include, by mass percentage, C: 0.35-0.40, Mn: 0.86-1.2, Al+Si: 1.55-1.62, Cr+Mo+Ni≤1.3, V+Nb+B: 0.10-0.125, P≤0.01, S≤0.01, Ti: 0.006-0.007, O: 0.0008-0.001, N: 0.004-0.005, H: 0.00005-0.00007, with Fe as a balance.

Optionally, the austenitizing treatment is a hot forming process of heating the rail steel to an austenitizing temperature, including hot rolling and forging, or an athermal forming process.

The present application discloses the following technical effects:

in view of the problem of high hydrogen embrittlement sensitivity of traditional bainitic rail steel, the present application uses gradient structure to enable the rail service surface with ultra-fine bainitic microstructure of high strength-toughness and wear resistance, and the matrix with ferrite-pearlite composite phase microstructure of low hydrogen embrittlement sensitivity, therefore ensuring that the rail is wear-resistant and fatigue-resistant on the rail service surface and that the rail bottom is not vulnerable to hydrogen embrittlement that causes damage;

for the problem that the overall thermal treatment process of conventional bainitic rail steel requires high alloying element content to improve hardenability, which leads to serious segregation, the present application prepares the matrix of the rail with a ferrite-pearlite composite phase microstructure using the gradient structure, so that only the outer surface layer of the service surface is ultra-fine bainite, thereby enabling the alloying element content to be drastically lowered, and significantly reducing the segregation in the rail steel;

as the matrix is already in a position of lower temperature prior to rapid heating, the present application is designed with a gradient structure so that the superficial layer of the rail is capable of rapid cooling after rapid heating austenitizing, thereby avoiding the ferrite and pearlite transformation intervals and allowing the superficial layer to undergo a bainite transformation; and by the design of the gradient structure of the present application, the superficial layer of the rail steel is ultra-fine bainite obtained by rapid heating treatment, with significant grain refinement and obvious improvement in strength and toughness; and the matrix is in a microstructure of ferrite+pearlite, with significantly improved toughness compared to that of conventional pearlite steel rail steel.

BRIEF DESCRIPTION OF THE DRAWINGS

For a clearer description of the technical schemes in the embodiments or prior art of the present application, the accompanying drawings to be used in the embodiments are briefly described hereinafter, and it is obvious that the accompanying drawings in the description hereinafter are only some of the embodiments of the present application, and that for a person of ordinary skill in the field, other accompanying drawings may be obtained based on the accompanying drawings without any creative effort.

DETAILED DESCRIPTION OF THE EMBODIMENTS

Various exemplary embodiments of the present application are now described in detail, which should not be considered as a limitation of the present application, but should be understood as a further detailed description of certain aspects, features, and embodiments of the present application.

It should be understood that the terminology described in the present application is only for describing specific embodiments and is not used to limit the present application. In addition, for the numerical range in the present application, it should be understood that each intermediate value between the upper limit and the lower limit of the range is also specifically disclosed. The intermediate value within any stated value or stated range and every smaller range between any other stated value or intermediate value within the stated range are also included in the present application. The upper and lower limits of these smaller ranges may be independently included or excluded from the range.

Unless otherwise specified, all technical and scientific terms used herein have the same meaning as commonly understood by one of ordinary skill in the art to which this application relates. Although the present application only describes the preferred methods and materials, any methods and materials similar or equivalent to those described herein may also be used in the practice or testing of the present application. All documents mentioned in this specification are incorporated by reference to disclose and describe methods and/or materials related to the documents. In case of conflict with any incorporated document, the contents of this specification shall prevail.

It is obvious to those skilled in the art that many improvements and changes can be made to the specific embodiments of the present application without departing from the scope or spirit of the present application. Other embodiments will be apparent to the skilled person from the description of the application. The description and embodiments of that present application are exemplary only.

The terms "including", "comprising", "having" and "containing" used in this specification are all open terms, which means including but not limited to.

The technical schemes of the present application are further described below by means of embodiments.

The "room temperature" in the present application means 25+/−2 degrees Celsius(° ° C. unless otherwise specified.

Figure 3:
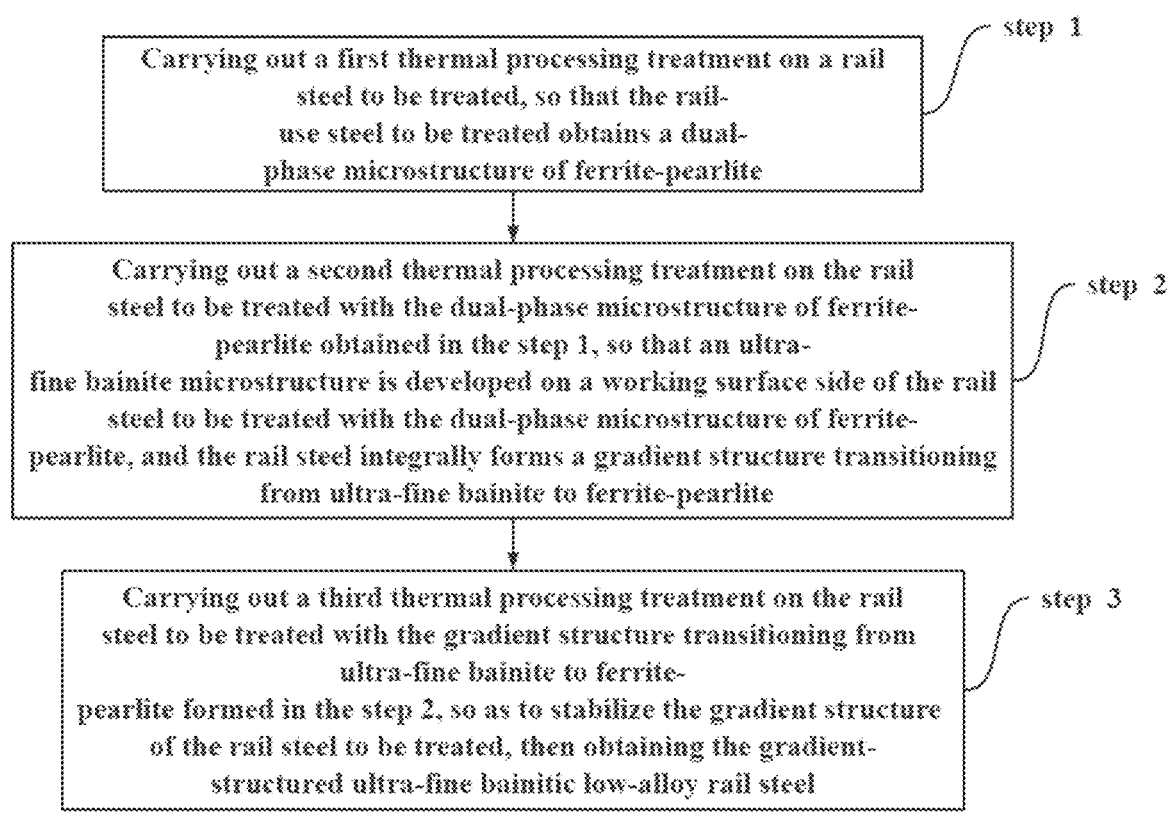
FIG. 3 illustrates a process of a preparation method of the gradient-structured ultra-fine bainitic low-alloy rail steel provided by the present application.

The present application provides a preparation method of the gradient-structured ultra-fine bainitic low-alloy rail steel according to claim 1, comprising following steps as shown in FIG. 3:

step 1, carrying out a first thermal processing treatment on a rail steel to be treated, so that the rail steel to be treated obtains a dual-phase microstructure of ferrite-pearlite step 2, carrying out a second thermal processing treatment on the rail steel to be treated with the dual-phase microstructure of ferrite-pearlite obtained in the step 1, so that an ultra-fine bainite microstructure is developed on a working surface side of the rail steel to be treated with the dual-phase microstructure of ferrite-pearlite, and the rail steel integrally forms a gradient structure transitioning from ultra-fine bainite to ferrite-pearlite; and step 3, carrying out a third thermal processing treatment on the rail steel to be treated with the gradient structure transitioning from ultra-fine bainite to ferrite-pearlite formed in the step 2, so as to stabilize the gradient structure of the rail steel to be treated, then obtaining the gradient-structured ultra-fine bainitic low-alloy rail steel.

Embodiment 1

A rail steel to be treated includes main chemical components of, by mass percentage, C: 0.35, Al+Si: 1.55, Mn: 1.20, Cr+Mo+Ni: 1.30, V+Nb+B: 0.10, O: 0.0010, H: 0.00007, N: 0.004, Ti: 0.006, P: 0.01, S: 0.01, with Fe as a balance. The martensitic transformation onset temperature Ms is 322° C.

A preparation method of a gradient-structured ultra-fine bainitic low-alloy rail steel includes following steps:

(1) the rail steel to be treated processed into a rail shape is austenitized at 920° C. and thermally held for 80 minutes (min), then the austenitized rail steel to be treated is cooled to a first preset temperature of 650° ° C. at a first cooling speed of 10 degrees Celsius per second (° C./s), after which the rail steel to be treated is cooled to a second preset temperature of 580° C. at a first slow cooling speed of 0.02° C./s, and cooled to a third preset temperature of 330° C. at a second cooling speed of 1° C./s;

(2) by using induction heating treatment, an area of 15 mm depth below a working side surface of the rail steel treated in step (1) is rapidly heated to 960° C. at 10° C./s, thermally held for 60 s to austenitize the 15 mm depth rail steel, then the 15 mm depth rail steel to be treated is cooled to a fourth preset temperature of 340° ° C. at a third cooling speed of 5° C./s, and then cooled to room temperature at a second slow cooling speed of 0.016° C./s; and (3) the rail steel treated in the step (2) is tempered at 320° C. for 20 hours (h) to stabilize a gradient structure of the rail steel to be treated, and a gradient-structured ultra-fine bainitic low-alloy rail steel is obtained.

Figure 1:
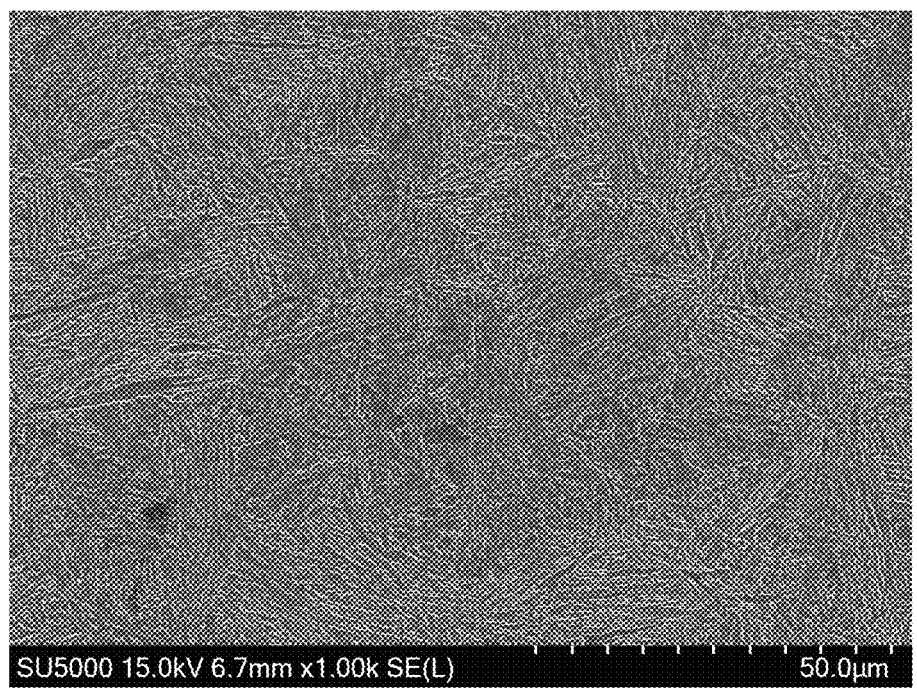
FIG. 1 shows a scanning electron microscope (SEM) image of surface microstructure of a gradient-structured ultra-fine bainitic low-alloy rail steel prepared in Embodiment 1 of the present application.

See FIG. 1 for a scanning electron microscope (SEM) image of a surface microstructure of the gradient-structured ultra-fine bainitic low-alloy rail steel prepared in Embodiment 1 of the present application, from which it can be seen that the surface microstructure is of ultrafine bainitic microstructure, with a yield strength of 1,120 megapascals (MPa), a tensile strength of 1,390 MPa, an elongation of 16%, and a room-temperature impact toughness of 102 joules per square centimeter ($J/cm^2$).

Figure 2:
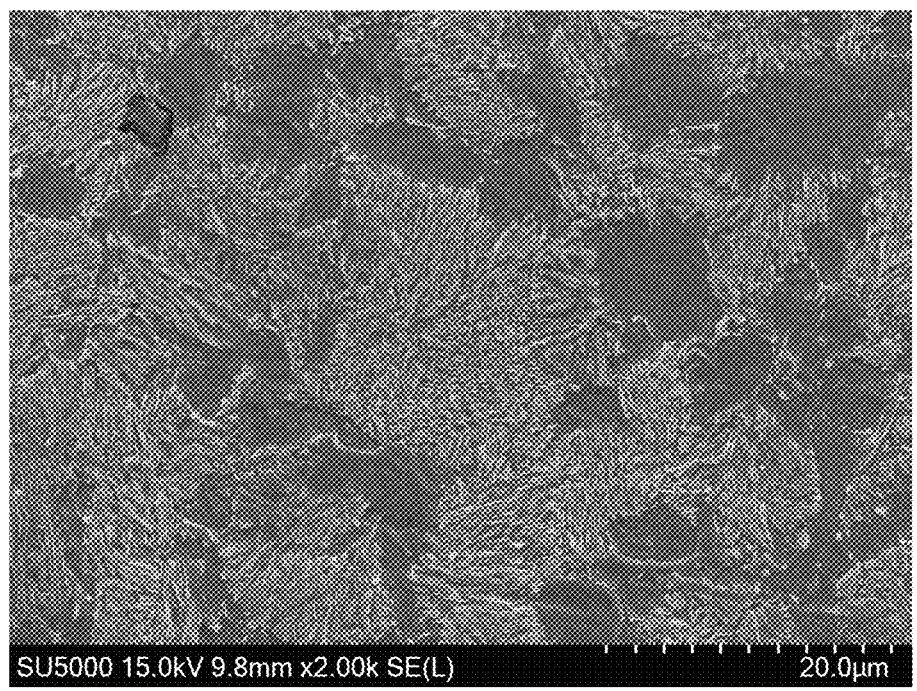
FIG. 2 shows an SEM image of matrix microstructure of the gradient-structured ultra-fine bainitic low-alloy rail steel prepared in the Embodiment 1 of the present application.

See FIG. 2 for an SEM image of a matrix structure of the gradient-structured ultra-fine bainitic low-alloy rail steel prepared in Embodiment 1 of the present application, and it can be seen from the FIG. 2 that the matrix structure is of ferrite+pearlite structure, with a yield strength of 697 MPa, a tensile strength of 960 MPa, an elongation of 18.2% and a room-temperature impact toughness of 63 $J/cm^2$.

Embodiment 2

The rail steel to be treated includes main chemical components of, by mass percentage, C: 0.35, Al+Si: 1.55, Mn: 1.20, Cr+Mo+Ni: 1.30, V+Nb+B: 0.10, O: 0.0010, H: 0.00007, N: 0.004, Ti: 0.006, P: 0.01, S: 0.01, with Fe as the balance. The martensitic transformation onset temperature Ms is 322° C.

The preparation method of the gradient-structured ultra-fine bainitic low-alloy rail steel includes the following steps:

(1) the rail steel to be treated processed into a rail shape is austenitized at 920° C. and thermally held for 80 min, then the austenitized rail steel to be treated is cooled to a first preset temperature of 550° C. at a first cooling speed of 20° C./s, then a first temperature holding is carried out, and the steel is thermally held for 60 min, then cooled to a third preset temperature of 200° ° C. at a second cooling speed of 1° C./s;

(2) by using induction heating treatment, an area of 5 mm depth below the working side surface of the rail steel treated in step (1) is rapidly heated to 950° C. at 200° C./s, and thermally held for 20 s to austenitize the 5 mm depth rail steel, then the 5 mm depth rail steel to be treated is cooled to a fourth preset temperature of 302° ° C. at a third cooling speed of 10° C./s, and a second temperature holding is carried out by holding temperature for 1 h, followed by air-cooling to room temperature; and (3) the rail steel treated in the step (2) is tempered at 480° ° C. for 1 h to stabilize the gradient structure of the rail steel to be treated, and the gradient-structured ultra-fine bainitic low-alloy rail steel is obtained.

The surface microstructure of the gradient-structured ultra-fine bainitic low-alloy rail steel prepared in Embodiment 2 of the present application is of ultrafine bainitic microstructure, with a yield strength of 1,060 MPa, a tensile strength of 1,320 MPa, an elongation of 19%, and a room-temperature impact toughness of 115 $J/cm^2$.

The matrix microstructure of the gradient-structured ultra-fine bainitic low-alloy rail steel prepared in Embodiment 2 of the present application is of ferrite+pearlite microstructure, with a yield strength of 712 MPa, a tensile strength of 985 MPa, an elongation of 17%, and a room-temperature impact toughness of 65 $J/cm^2$.

Embodiment 3

The rail steel to be treated includes main chemical components of, by mass percentage, C: 0.40, Al+Si: 1.62, Mn: 0.86, Cr+Mo+Ni: 0.65, V+Nb+B: 0.125, O: 0.0008, H:

0.00005, N: 0.005, Ti: 0.007, P: 0.01, S: 0.01, with Fe as the balance. The martensitic transformation onset temperature Ms is 327° C.

The preparation method of the gradient-structured ultra-fine bainitic low-alloy rail steel includes the following steps:
(1) the rail steel to be treated processed into a rail shape is austenitized at 930° C. and thermally held for 120 min, then the austenitized rail steel to be treated is cooled to a first preset temperature of 620° ° C. at a first cooling speed of 0.3° C./s, then the steel is thermally preserved for 20 min, then cooled to a third preset temperature of 300° C. at a second cooling speed of 0.3° C./s;
(2) by using induction heating treatment, an area of 50 mm depth below the working side surface of the rail steel treated in step (1) is rapidly heated to 950° ° C. at 25° ° C./s, thermally held for 10 min to austenitize the 50 mm depth rail steel, then the 50 mm depth rail steel to be treated is cooled to a fourth preset temperature of 330° C. at a third cooling speed of 1.5° C./s, and then cooled to room temperature at a second slow cooling speed of 0.01° C./s; and
(3) the rail steel treated in the step (2) is tempered at 320° ° C. for 10 h to stabilize the gradient structure of the rail steel to be treated, and the gradient-structured ultra-fine bainitic low-alloy rail steel is obtained.

The surface microstructure of the gradient-structured ultra-fine bainitic low-alloy rail steel prepared in Embodiment 3 of the present application is of ultrafine bainitic microstructure, with a yield strength of 1,250 MPa, a tensile strength of 1,415 MPa, an elongation of 14.7%, and a room-temperature impact toughness of 95 J/cm$^2$.

The matrix microstructure of the gradient-structured ultra-fine bainitic low-alloy rail steel prepared in Embodiment 3 of the present application is of ferrite+pearlite microstructure, with a yield strength of 676 MPa, a tensile strength of 922 MPa, an elongation of 19.5%, and a room-temperature impact toughness of 51 J/cm$^2$.

Embodiment 4

The rail steel to be treated includes main chemical components of, by mass percentage, C: 0.40, Al+Si: 1.62, Mn: 0.86, Cr+Mo+Ni: 0.65, V+Nb+B: 0.125, O: 0.0008, H: 0.00005, N: 0.005, Ti: 0.007, P: 0.01, S: 0.01, with Fe as the balance. The martensitic transformation onset temperature Ms is 327° C.

The preparation method of the gradient-structured ultra-fine bainitic low-alloy rail steel includes the following steps:
(1) the rail steel to be treated processed into a rail shape is austenitized at 930° ° C. and thermally held for 120 min, then the austenitized rail steel to be treated is cooled to a first preset temperature of 710° ° C. at a first cooling speed of 0.3° C./s, after which the rail steel to be treated is cooled to a second preset temperature of 500° ° C. at a first slow cooling speed of 0.06° C./s, and then cooled to a third preset temperature of 350° C. at a second cooling speed of 10° C./s;
(2) by using induction heating treatment, an area of 0.5 mm depth below the working side surface of the rail steel treated in step (1) is rapidly heated to 970° C. at 100° C./s, thermally held for 1 s to austenitize the 0.5 mm depth rail steel, then the 0.5 mm depth rail steel to be treated is cooled to a fourth preset temperature of 365° C. at a third cooling speed of 20° C./s, and then cooled to room temperature at a second slow cooling speed of 0.10° C./s; and
(3) the rail steel treated in step (2) is tempered at 200° ° C. for 30 h to stabilize the gradient structure of the rail steel to be treated, and the gradient-structured ultra-fine bainitic low-alloy rail steel is obtained.

The surface microstructure of the gradient-structured ultra-fine bainitic low-alloy rail steel prepared in Embodiment 4 of the present application is of ultrafine bainitic microstructure, with a yield strength of 1,290 MPa, a tensile strength of 1,435 MPa, an elongation of 15.8%.

The matrix microstructure of the gradient-structured ultra-fine bainitic low-alloy rail steel prepared in Embodiment 4 of the present application is of ferrite+pearlite microstructure, with a yield strength of 655 MPa, a tensile strength of 902 MPa, an elongation of 15.3%, and a room-temperature impact toughness of 51 J/cm$^2$.

Embodiment 5

The rail steel to be treated includes main chemical components of, by mass percentage, C: 0.35, Al+Si: 1.58, Mn: 1.20, Cr+Mo+Ni: 1.30, V+Nb+B: 0.12, O: 0.0010, H: 0.00007, N: 0.004, Ti: 0.006, P: 0.01, S: 0.01, with Fe as the balance. The martensitic transformation onset temperature Ms is 335° C.

The preparation method of the gradient-structured ultra-fine bainitic low-alloy rail steel includes the following steps:
(1) the rail steel to be treated processed into a rail shape is austenitized at 920° C. and thermally held for 80 min, then the austenitized rail steel to be treated is cooled to a first preset temperature of 750° ° C. at the first cooling speed of 10° C./s, after which the rail steel to be treated is cooled to a second preset temperature of 620° C. at a first slow cooling speed of 0.02° C./s, and then cooled to the third preset temperature of 330° ° C. at a second cooling speed of 0.1° C./s;
(2) by using induction heating treatment, an area of 25 mm depth below the working side surface of the rail steel treated in step (1) is rapidly heated to 960° C. at 5° C./s, thermally held for 5 min to austenitize the 25 mm depth rail steel, then the 25 mm depth rail steel to be treated is cooled to a fourth preset temperature of 370° ° C. at a third cooling speed of 0.6° C./s, and then cooled to room temperature at a second slow cooling speed of 0.2° C./s; and
(3) the rail steel treated in step (2) is tempered at 500° C. for 0.5 h to stabilize a gradient structure of the rail steel to be treated, and a gradient-structured ultra-fine bainitic low-alloy rail steel is obtained.

The surface microstructure of the gradient-structured ultra-fine bainitic low-alloy rail steel prepared in Embodiment 5 of the present application is of ultrafine bainitic microstructure, with a yield strength of 1,015 MPa, a tensile strength of 1,308 MPa, an elongation of 17%, and a room-temperature impact toughness of 92 J/cm$^2$.

The matrix microstructure of the gradient-structured ultra-fine bainitic low-alloy rail steel prepared in Embodiment 5 of the present application is of ferrite+pearlite microstructure, with a yield strength of 578 MPa, a tensile strength of 907 MPa, an elongation of 16%, and a room-temperature impact toughness of 40 J/cm$^2$.

In a comparison of the embodiments of the present application with conventional U75V and U71 Mn pearlitic rail steels of the same strength level, the impact toughness of the conventional U75V and U71Mn pearlitic rail steels of the same strength level is in the range of 15-25 J/cm$^2$, so the toughness of the gradient-structured ultra-fine bainitic low-alloy rail steel prepared by the embodiments of the present application is also significantly improved over the toughness of the conventional pearlitic steel rail steel.

The above-mentioned embodiments only describe the preferred modes of the present application, and do not limit the scope of the present application. Under the premise of not departing from the design spirit of the present application, various modifications and improvements made by ordinary technicians in the field to the technical scheme of the present application shall fall within the protection scope determined by the claims of the present application.

What is claimed is:

1. A preparation method of the gradient-structured ultra-bainitic rail steel, comprising following steps:
   (1) carrying out a first thermal processing treatment on a rail steel to be treated, and making the rail steel to be treated obtain a dual-phase microstructure of ferrite-pearlite;
   (2) carrying out a second thermal processing treatment on the rail steel to be treated with the dual-phase microstructure of ferrite-pearlite obtained in the step (1), enabling an bainite microstructure to be developed on a working surface side of the rail steel to be treated with the dual-phase microstructure of ferrite-pearlite, and the rail steel integrally forming a gradient structure transitioning from bainite to ferrite-pearlite; and
   (3) carrying out a third thermal processing treatment on the rail steel to be treated with the gradient structure transitioning from bainite to ferrite-pearlite formed in step (2), so as to stabilize the gradient structure of the rail steel to be treated, then obtaining the gradient-structured bainitic rail steel;
   wherein the step (2) specifically comprises following steps:
   rapidly heating a working side surface of the rail steel to be treated with the dual-phase microstructure of ferrite-pearlite obtained in the step (1), followed by temperature holding, and cooling the rail steel to be treated to a fourth preset temperature at a third cooling speed, then performing second temperature holding or second slow cooling to develop the bainite microstructure in a region of rapid heating layer of the rail steel to be treated;
   the third cooling speed is 0.6° C./s-20° C./s, the fourth preset temperature is Ms−20° C.-Ms+50° C., Ms is an onset temperature of martensitic transformation of the rail steel; and a speed of the second slow cooling is 0.005° C./s-0.2° C./s; and a heating speed of the rapid heating is 5° C./s-200° C./s; a duration for the temperature holding is 1 s-10 min; the working side surface of the rail steel to be treated covers a depth of 0.5 mm-50 mm below a surface of the rail steel.

2. The preparation method of the gradient-structured bainitic rail steel according to claim 1, wherein the step (1) specifically comprises following steps:
   austenitizing the rail steel to be treated to obtain an austenitized rail steel to be treated; and
   carrying out cooling on the austenitized rail steel to be treated to a first preset temperature at a first cooling speed, then carrying out first temperature holding or first slow cooling, making the rail steel to be treated forming the dual-phase microstructure of ferrite-pearlite; wherein the first cooling speed is 0.3° C./s-20° C./s, and the first preset temperature is 550° C.-750° C.

3. The preparation method of the gradient-structured bainitic rail steel according to claim 2, wherein the first slow cooling specifically comprises: cooling the rail steel to be treated to a second preset temperature at a first slow cooling speed, and cooling the rail steel to be treated to a third preset temperature at a second cooling speed;
   the first slow cooling speed is 0.01° C./s-0.1° C./s, and the second preset temperature is 500° C.-650° C.; and
   the second cooling speed is 0.1° C./s-10° C./s, and the third preset temperature is 200° C.-350° C.

4. The preparation method of the gradient-structured bainitic rail steel according to claim 1, wherein the step (3) specifically comprises following steps:
   carrying out a tempering treatment on the rail steel to be treated with a gradient structure of bainite-ferrite-pearlite formed in the step (2), so as to stabilize the gradient structure of the rail steel to be treated, and then obtaining the gradient-structured bainitic rail steel;
   wherein a tempering temperature during the tempering treatment is 200° C.-500° C.

5. The preparation method of the gradient-structured bainitic rail steel according to claim 1, wherein the rail steel to be treated comprises components of, by mass percentage, C: 0.25-0.55, Mn: 0.5-2.0, Al+Si: 0.8-1.8, Cr+Mo+Ni<1.5, V+Nb+B: 0.06-0.20, P<0.02, S<0.02, Ti<0.01, O<0.0015, N<0.008, H<0.0001, with Fe as a balance.

* * * * *